Patented Sept. 7, 1937

2,092,741

UNITED STATES PATENT OFFICE 2,092,741

SYNTHETIC RESIN AND METHOD OF PRODUCING

Irvin W. Humphrey, Wilmington, Del., assignor to Hercules Powder Company, Wilmington, Del., a corporation of Delaware No Drawing. Application January 29, 1935, Serial No. 3,943

24 Claims. (Cl. 260—8)

My invention relates to a resinous composition and method of producing and more particularly relates to a new form of synthetic resin and method for its production.

My invention broadly involves a reaction product of a polyhydric alcohol and an acidic resin formed from a pinene, as alpha-pinene, beta-pinene, etc. and maleic anhydride, the product being characterized by the fact that the polyhydric alcohol is only partially combined with the acidic resin.

In carrying out my invention the partial combination of the polyhydric alcohol with an acidic resin formed from a pinene and maleic anhydride may be effected in various ways with the production of products possessed of varying and widely differing characteristics. Thus, the partial combination may be accomplished by causing the reaction between a polyhydric alcohol and the acidic resin to be stopped prior to complete combination of the polyhydric alcohol with the acidic resin or by partially combining the polyhydric alcohol with some substance other than the acidic resin.

In carrying out my invention the reaction between a polyhydric alcohol and the acidic resin described above may be stopped prior to complete combination of the alcohol with the acidic resin by any desired manipulation, but preferably will be effected through carrying out the reaction in the presence of some substance which will operate to either cause the alcohol to be less reactive and thus render its reaction with the acidic resin readily terminable prior to its complete combination therewith, or which will itself react with the alcohol and with which the alcohol will partially combine. Alternatively, the polyhydric alcohol may be pretreated for its partial combination with some suitable substance and finally reacted with the acidic resin for its partial combination therewith, or, where the reaction of the alcohol with the acidic resin is stopped before complete combination of the alcohol with the acidic resin, the product may be reacted with a substance which will satisfy the remaining reactive portion of the alcohol.

As generally illustrative of the carrying out of my invention where, for example, the product desired involves the reaction of glycerol with an acidic resin and the reaction is carried out in the presence of a substance enabling the reaction to be readily terminated, the product will comprise glycerol molecules with which have combined acidic resin molecules, to an extent, however, insufficient to fully satisfy the reactive capacity of the glycerol molecules. In other words, in the case of glycerol having three hydroxyl groups the three groups will not be completely combined with the acidic resin.

On the other hand, where, for example, for the production of a desired product glycerol and the acidic resin are reacted in the presence of a substance which itself will combine with the glycerol, the product will involve glycerol molecules combined partially with acidic resin molecules and partially with molecules of the other substance used. In other words, the hydroxyl groups of the glycerol will be combined with the acidic groups of the resin in part and in part with the other substance used.

Thus, in accordance with my invention it will now be understood that the novel product contemplated by me involves a polyhydric alcohol partially combined with an acidic resin formed from a pinene and maleic anhydride and that the novel method embodying my invention involves more particularly effecting the partial combination of a polyhydric alcohol and the acidic resin in the presence of a substance which will enable termination of the reaction before complete combination without itself entering into the reaction or which entering into the reaction will partly combine with the alcohol, which substances I shall hereinafter refer to as modifying agents.

The synthetic resins embodying my invention will differ widely in their physical characteristics and in their adaptability for various uses depending upon the particular polyhydric alcohol used and the method followed in their production. Thus, they may be hard or soft bodies or may be viscous liquids and will be adaptable for use for various purposes, as for example, in substitution for gums or resins in lacquers, varnishes, and the like.

The acidic resins for the formation of these synthetic resins embodying this invention are formed by the reaction of a pinene with maleic anhydride. The resinous esters embodying this invention may be produced by the esterification of an acidic resin formed by the reaction of a pinene, as alpha-pinene, beta-pinene, etc., and maleic anhydride, or equivalently maleic acid, in the presence of heat, for example, as disclosed in my application for United States patent, Serial No. 688,360, filed September 6, 1933, now Patent 1,993,034.

The acidic resins may be prepared, as is more fully disclosed in the application above referred to, by heating a pinene, such as, alpha- or beta-pinene, with maleic anhydride. The reaction may be effected in any suitable manner, but will preferably be carried out by refluxing the pinene with the maleic anhydride. It is desirable to use an excess of pinene, which can be recovered unchanged by distillation upon completion of the reaction.

For reaction with the acidic resin I may use any suitable polyhydric alcohol, as for example, glycerol, polyglycerol and a glycol, as ethylene glycol, propylene glycol, diethylene glycol, or the like, etc., substituted polyhydric alcohols, such as, glyceryl monoacetate, glyceryl monoethyl ether, glyceryl monochlorhydrin, etc. The polyhydric alcohol may be in admixture with a monohydric alcohol, such as ethyl, methyl, butyl, bornyl, fenchyl, abietyl alcohol, etc.

As the modifying agent I may use various substances, as for example, an organic acid, a natural resin or resin acid, as rosin or abietic acid, manila copal, Congo copal, etc., a vegetable or animal oil, as linseed soil, China-wood oil, castor oil, fish oil, etc., or the fatty acids derived therefrom, fatty acids, such as stearic acid, oleic acid, etc. and dibasic acids, such as succinic, maleic acid, tartaric acid, adipic acid, sebacic acid, etc.

It will be understood that I contemplate the use of operable equivalents for the polyhydric alcohols mentioned and for the several modifying agents mentioned.

In proceeding in accordance with my invention for the production of a synthetic resin, for example, a mixture of about 115 parts by weight of alpha-pinene-maleic anhydride, 75 parts of rosin (acid number 180) and 46 parts of glycerol are heated together at a temperature of about 210° C. for about seven hours and the temperature then raised to about 250° C. and the heating continued for about three hours. The treatment may be carried out in any suitable form of apparatus. During the heating considerable foaming will be noted and it is, therefore, desirable, as indicated above, to heat for a period at the lower temperature and to raise the temperature only when the reaction is nearly completed.

The synthetic resin prepared as above described will comprise glycerol partially combined with alpha-pinene-maleic anhydride and partially with abietic acid of the rosin, which, as will be understood, is capable of reacting with the glycerol and does react in the preparation of the resin preventing complete combination of the glycerol with the alpha-pinene-maleic anhydride.

The synthetic resin prepared as indicated will be found to be of a very light color, very clear and transparent, to have an acid number of about 16 and a softening point of about 120° C. The synthetic resin will be found to be soluble in various known ester solvents and to be soluble in acetone, etc. The synthetic resin will be found to be only slightly soluble in alcohol and hydrocarbon solvents.

As a further illustration, for example, 330 parts by weight of rosin (A. N. 170) are dissolved in 234 parts of alpha-pinene-maleic anhydride by heating, and 115 parts of glycerol are added. The mixture is gradually heated to a temperature of 270° C. and maintained at that temperature for approximately 7 hours. Agitation may be employed but is not absolutely essential since the evolution of water vapor serves to keep the mixture well stirred. The excess of glycerol is removed by applying a vacuum to the resin while in the heated condition. The product will comprise glycerol partially combined with alpha-pinene-maleic anhydride and partially with abietic acid.

By the above procedure a variety of esters having various characteristics and adaptable for various purposes, as for use in varnishes, lacquers, japans, paints, as substitutes for hard rubber and various other plastic articles, films, etc., may be prepared by varying the proportions of rosin and of pinene-maleic anhydride used with resultant variation in the proportionate combination of abietic acid and of pinene-maleic anhydride with the glycerol.

As a further illustration, for example, 177 parts by weight of alpha-pinene-maleic anhydride and 165 parts rosin (A. N. 170) are heated together at about 150° C. to form a homogeneous solution, and 77 parts of ethylene glycol are then added. The mixture is heated at the boiling point of the solution, approximately 210° C., for about 8 hours. The excess glycol may be removed at the completion of the reaction by applying a vacuum. The product will involve ethylene glycol partially combined with alpha-pinene-maleic anhydride and partially with abietic acid.

And as will be understood resins having various desirable characteristics and adaptable for various purposes may be prepared by the above indicated procedure with the use as the modifying agent of various acidic gums, as Congo or manila copal, etc., in place of rosin and the use of another polyhydric alcohol, as polyglycerol, ethylene glycol, etc. in place of glycerol. The various resins will, as has been indicated, involve a polyhydric alcohol partially combined with the synthetic acidic resin and partially with the acid of the particular natural resin used in its preparation.

As a further illustration of the procedure for the preparation of synthetic resins in accordance with my invention using, for example, a vegetable oil or an acid derived therefrom as a modifying agent, for example, about 234 parts by weight of alpha-pinene-maleic anhydride and 56 parts of, for example, raw linseed oil are heated together until a homogeneous solution is produced, then about 62 parts by weight of glycerol is added and the mixture heated to a temperature of about 200° C. until the evolution of water vapor has ceased, indicating completion of the reaction. Completion of the reaction will usually require about 9 to 10 hours where the heating is at 200° C., or the required period may be shortened somewhat by using a slightly higher temperature.

The product produced as above described, using linseed oil, will comprise largely glycerol partially combined with alpha-pinene-maleic anhydride and partially reactive or uncombined, that is to say, a portion of a hydroxyl group of the glycerol or one or more of the groups will be uncombined with alpha-pinene-maleic anhydride though at the temperature used there may be some decomposition of the linseed oil resulting in the freeing of the fatty acid of the linseed oil which, insofar as such may be freed may combine with the portion of the glycerol uncombined with the alpha-pinene-maleic anhydride. The presence of the linseed oil, however, will operate to enable the reaction between the glycerol and the alpha-pinene-maleic anhydride to be terminated prior to complete combination of the alpha-pinene-maleic anhydride with the glycerol and hence the product will be characterized by the fact that the glycerol molecules are not completely combined with alpha-pinene-maleic anhydride though the uncombined portions of the glycerol molecules may be in whole or in part combined with the fatty acid of linseed oil, or may be in whole or in part reactive.

The synthetic resin produced will be found to be soluble in acetone, toluol and ester solvents generally, will be found to possess a high degree of flexibility, to be largely resistant to water, to satisfactorily harden at ordinary temperatures by the absorption of oxygen and to lend itself desirably for various uses such, for example, as in the preparation of varnishes, lacquers and enamels.

As a further illustration, for example, 1053 parts by weight of alpha-pinene-maleic anhydride are heated with about 252 parts of castor oil until a homogeneous solution results, then about 166 parts by weight of glycerol are added and the mixture heated at 215° C.–220° C. until the evolution of water vapor has ceased indicating completion of the reaction. The castor oil will operate in much the same manner as does linseed oil, namely, it will enable the reaction between the glycerol and the alpha-pinene-maleic anhydride to be terminated before complete combination of the glycerol with alpha-pinene-maleic anhydride and with such combination with the glycerol and the fatty acid of castor oil as may result from the freeing of the fatty acid through decomposition of the oil at the temperature used. The resultant resin will be found to be a light yellow in color, very clear and very tough, to be soluble in acetone and in ester solvents, to soften at approximately 100° C. and to be compatible with nitrocellulose, rendering it desirable for use in nitrocellulose lacquers, though it will be found to have various other uses, as for example, in varnishes, etc.

As a further illustration, for example, 351 parts by weight of alpha-pinene-maleic anhydride are dissolved in 284 parts raw linseed oil, the mixture heated to 150° C. and 92 parts of glycerol added. This mixture is then heated for eight hours at a temperature of 220° C. The resin produced is a pale yellow viscous liquid.

The resin will involve glycerol partly combined with alpha-pinene-maleic anhydride and partly uncombined or combined with the acid of linseed oil insofar as such may be freed through decomposition of linseed oil at the temperature used.

As has been indicated, synthetic resins embodying my invention may be produced by the use of fatty acids derived from vegetable or animal oils. Thus, for example, for the preparation of a synthetic resin embodying my invention 234 parts by weight of alpha-pinene-maleic anhydride are heated with 283 parts of the mixture of fatty acids produced by the saponification of linseed oil and technically known as "linseed fatty acids" to form a homogeneous solution. To the hot solution 92 parts of glycerol are added and the mixture is heated at a temperature of 220° C. for approximately 6 hours. The temperature is then raised to 250° C. for two hours. The reaction is carried out in a vessel of such shape and construction that air may be excluded from the reaction mixture, as it is necessary to prevent oxidation of the fatty acids. For example, carbon dioxide or nitrogen gas may be passed into the vessel during the heating.

Where the resin is produced by reacting the acidic resin and a polyhydric alcohol in the presence of a fatty acid derived from a vegetable or animal oil, the resin product will involve essentially the polyhydric alcohol partially combined with the acidic resin and partially combined with the fatty acid used.

As a further illustration, for example, 293 parts by weight of alpha-pinene-maleic anhydride and 142 parts of the fatty acids obtained by the saponification of China-wood oil are heated for a few minutes to form a homogeneous solution and then 92 parts of glycerol are added. This mixture is heated in a closed vessel at a temperature of 215° C.–220° C. for 5 to 6 hours in an inert atmosphere. The resin resulting is a transparent, light yellow solid. The resin will comprise essentially glycerol partially combined with alpha-pinene-maleic anhydride and partially combined with the fatty acid of China-wood oil.

In proceeding with the use of fatty acids the addition of a small amount of rosin in the preparation of these resins facilitates the reaction appreciably and prevents the formation of insoluble gels in many cases. Where the reaction is carried on in the presence of rosin as well as of a fatty acid, the resin product will involve the polyhydric alcohol partially combined with the synthetic acidic resin, with the fatty acid and with abietic acid.

As a further illustration, for example, 234 parts by weight of alpha-pinene-maleic anhydride, 165 parts rosin (A. N. 170) and 146 parts of the fatty acids derived from linseed oil are heated together at about 150° C. until a homogeneous mixture results and 92 parts of glycerol are then added. The mixture is heated at a temperature of 200° C. until the evolution of water vapor ceases, usually from 8 to 10 hours. The reaction mixture is protected from the air as described above. The product will involve glycerol partially combined with alpha-pinene-maleic anhydride and partially with the fatty acid derived from linseed oil, and with abietic acid.

The resins produced as above from unsaturated fatty acids may be further heated with a drying oil such as China-wood oil, to give an improved composition. For example, the resin as described, produced with the fatty acids obtained by saponification of China-wood oil may be heated with 50% of its weight of China-wood oil to give an improved composition having excellent water resistance.

As a further illustration, with the use, for example, of a dibasic acid, for example, 92 parts of glycerol are heated with 211 parts of alpha-pinene-maleic anhydride and 71 parts of, for example, succinic acid at a temperature of 180° C.–200° C. for about 15 hours. Completion of the reaction may be noted by the fact that a cooled sample is not sticky. The resin produced will involve glycerol partially combined with alpha-pinene-maleic anhydride and partially combined with succinic acid. The resin product may be improved for various uses by further heating, as for example, by heating at a temperature of about 100° C. for a period of 24 hours and heating at a higher temperature, say 150° C.–200° C. for a period of say 15–24 hours.

In place of alpha-pinene-maleic anhydride, beta-pinene-maleic anhydride may be used in the examples given above in equivalent amount.

It will be understood that the synthetic resins in accordance with my invention may be prepared by various procedures differing from those described above by way of illustration, that is to say various proportions of acidic resin, of polyhydric alcohol and modifier may be used as well as various temperatures and times of treatment, depending upon the substances used. As has been indicated, any suitable form of apparatus may be used and the procedure may be carried out under various pressure conditions as may be desirable, depending upon the substances reacted.

It will also be understood that if desirable the reaction may be promoted through the use of catalysts, as for example, basic materials, such as calcium oxide or zinc oxide, or the like.

It will be clearly understood that I contemplate the production of the synthetic resins in accordance with my invention by the use of an acidic resin formed from a pinene and maleic anhydride, and of any suitable polyhydric alcohol including those specifically mentioned and operable equivalents therefor and with the use of any suitable modifying agent including those specifically mentioned and mixtures thereof and operable equivalents therefor.

It will be appreciated that the synthetic resin in accordance with my invention will involve essentially a polyhydric alcohol partially combined with an acidic resin formed from a pinene and maleic anhydride, and partially reactive or partially combined with some other substance, the partial combination with a substance other than the acidic resin being accomplished simultaneously with the partial combination with the acidic resin or being effected prior to or subsequent to such combination.

In the preparation of the synthetic resin any suitable form of apparatus may be used and it will be understood that in place of linseed oil any drying oil, semi-drying oil or non-drying oil, as perilla oil, soya bean oil, China-wood oil, fish oil, castor oil, etc. or the corresponding fatty acids may be used in place of linseed oil as the modifying agent.

It will be understood that where in the claims appended hereto the term "polyhydric alcohol" is used, such is intended to embrace and include substituted polyhydric alcohols as equivalents within the scope of this invention.

This application is a continuation in part of the application filed by me Serial No. 688,360, filed September 6, 1933.

What I claim and desire to protect my Letters Patent is:

1. A reaction product of a polyhydric alcohol, a pinene-maleic anhydride and an organic carboxylic acid.
2. A reaction product of a polyhydric alcohol, a pinene-maleic anhydride and a resin acid.
3. A reaction product of a polyhydric alcohol, a pinene-maleic anhydride and an aliphatic dibasic acid.
4. A reaction product of a polyhydric alcohol, a pinene-maleic anhydride and abietic acid.
5. A reaction product of a polyhydric alcohol, a pinene-maleic anhydride and succinic acid.
6. A reaction product of a polyhydric alcohol, a pinene-maleic anhydride and a fatty acid.
7. A reaction product of a polyhydric alcohol, a pinene-maleic anhydride and a fatty acid derived from linseed oil.
8. A reaction product of a polyhydric alcohol selected from the group consisting of glycerol and aliphatic glycols, a pinene-maleic anhydride, and an organic carboxylic acid.
9. The method of producing a synthetic resin which includes reacting together a polyhydric alcohol, a pinene-maleic anhydride, and an organic carboxylic acid.
10. The method of producing a synthetic resin which includes reacting together a polyhydric alcohol, a pinene-maleic anhydride and a resin acid.
11. The method of producing a synthetic resin which includes reacting together a polyhydric alcohol, a pinene-maleic anhydride and an aliphatic dibasic acid.
12. The method of producing a synthetic resin which includes reacting together a polyhydric alcohol, a pinene-maleic anhydride, and a fatty acid.
13. The method of producing a synthetic resin which includes reacting together in an inert atmosphere a polyhydric alcohol, a pinene-maleic anhydride, and a fatty acid.
14. A reaction product of a polyhydric alcohol, alpha-pinene-maleic anhydride and an organic carboxylic acid.
15. A reaction product of a polyhydric alcohol, beta-pinene-maleic anhydride and an organic carboxylic acid.
16. The method of producing a synthetic resin which includes reacting together a polyhydric alcohol, alpha-pinene-maleic anhydride and an organic carboxylic acid.
17. The method of producing a synthetic resin which includes reacting together a polyhydric alcohol, beta-pinene-maleic anhydride and an organic carboxylic acid.
18. A coating composition comprising a reaction product of a polyhydric alcohol, an organic carboxylic acid and a pinene-maleic anhydride, and a solvent.
19. A coating composition comprising a reaction product of a polyhydric alcohol, an organic carboxylic acid and a pinene-maleic anhydride, a non-volatile lacquer ingredient and a solvent.
20. A coating composition comprising a reaction product of a polyhydric alcohol, an organic carboxylic acid and a pinene-maleic anhydride, a non-volatile varnish ingredient and a solvent.
21. A reaction product of a polyhydric alcohol and resin acids including a pinene-maleic anhydride, characterized by the fact that only a part of the hydroxyl groups of the polyhydric alcohol are combined with the pinene-maleic anhydride.
22. A reaction product of a polyhydric alcohol selected from the group consisting of glycerol and aliphatic glycols, and resin acids including a pinene-maleic anhydride, characterized by the fact that only a part of the hydroxyl groups of the polyhydric alcohol are combined with the pinene-maleic anhydride.
23. The method of producing a synthetic resin which includes reacting together a polyhydric alcohol and resin acids including a pinene-maleic anhydride under conditions such that only a part of the hydroxyl groups of the polyhydric alcohol combine with the pinene-maleic anhydride.
24. The method of producing a synthetic resin which includes reacting together resin acids including a pinene-maleic anhydride and a polyhydric alcohol selected from the group consisting of glycerol and aliphatic glycols, under conditions such that only a part of the hydroxyl groups of the polyhydric alcohol combine with the pinene-maleic anhydride.

IRVIN W. HUMPHREY.